United States Patent
Kim et al.

(10) Patent No.: US 10,482,308 B2
(45) Date of Patent: Nov. 19, 2019

(54) METHOD OF RECOGNIZING FINGERPRINT AND ELECTRONIC DEVICE INCLUDING THE SAME

(71) Applicant: SAMSUNG ELECTRONICS CO., LTD., Suwon-si (KR)

(72) Inventors: Kyuhong Kim, Seoul (KR); Namjoon Kim, Anyang-si (KR); Byungkyu Lee, Seoul (KR); Seokwhan Chung, Hwaseong-si (KR); Changkyu Choi, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 100 days.

(21) Appl. No.: 15/609,516

(22) Filed: May 31, 2017

(65) Prior Publication Data
US 2018/0121702 A1 May 3, 2018

(30) Foreign Application Priority Data
Oct. 28, 2016 (KR) ........................ 10-2016-0142152

(51) Int. Cl.
*G06K 9/00* (2006.01)

(52) U.S. Cl.
CPC ....... *G06K 9/00033* (2013.01); *G06K 9/0002* (2013.01); *G06K 9/00026* (2013.01); *G06K 9/00053* (2013.01); *G06K 9/00912* (2013.01)

(58) Field of Classification Search
None
See application file for complete search history.

(56) References Cited

U.S. PATENT DOCUMENTS

| | | | | |
|---|---|---|---|---|
| 9,342,733 B2* | 5/2016 | Lee | ...................... | G06K 9/0008 |
| 9,386,245 B2* | 7/2016 | Fujita | ..................... | H04N 5/367 |
| 9,858,465 B2* | 1/2018 | Pyun | .................. | G06K 9/00073 |
| 2003/0142837 A1* | 7/2003 | Kondo | ............... | G05B 13/0265 381/94.1 |
| 2004/0026635 A1* | 2/2004 | Lee | .................... | G06K 9/00013 250/556 |
| 2004/0054473 A1* | 3/2004 | Shimomura | .......... | G01S 3/7865 701/301 |

(Continued)

FOREIGN PATENT DOCUMENTS

| KR | 10-2015-0142562 A | 5/2001 |
|---|---|---|
| KR | 10-1291039 B1 | 8/2013 |

OTHER PUBLICATIONS

Extraction of Finger-Vein Patterns Using Maximum Curvature Points in Image Profiles, Naoto Miura et al., MVA2005IAPR, 2005, pp. 347-350 (Year: 2005).*

*Primary Examiner* — Jayesh A Patel
(74) *Attorney, Agent, or Firm* — Sughrue Mion, PLLC (57) ABSTRACT

Provided are a method of recognizing a fingerprint and a device including the same. The method of recognizing a fingerprint includes obtaining a fingerprint image from a fingerprint sensor, determining whether a pixel in the fingerprint image is defective based on a dispersion value of the pixel with respect to time, in response to determining that the pixel is defective, generating an interpolated pixel value of the pixel by performing interpolation on a first pixel value of the pixel based on a second pixel value of another pixel different from the pixel, and correcting the fingerprint image based on the interpolated pixel value.

13 Claims, 8 Drawing Sheets

(56) References Cited

U.S. PATENT DOCUMENTS

| | | | |
|---|---|---|---|
| 2005/0123214 A1* | 6/2005 | Takahira | G06T 5/004 |
| | | | 382/266 |
| 2005/0141755 A1* | 6/2005 | Lee | G06K 9/00013 |
| | | | 382/124 |
| 2013/0051628 A1* | 2/2013 | Fukuda | G06K 9/00885 |
| | | | 382/115 |
| 2014/0340547 A1* | 11/2014 | Kobayashi | H04N 5/367 |
| | | | 348/247 |
| 2016/0004899 A1* | 1/2016 | Pi | G06F 1/1626 |
| | | | 345/173 |

* cited by examiner

METHOD OF RECOGNIZING FINGERPRINT AND ELECTRONIC DEVICE INCLUDING THE SAME

CROSS-REFERENCE TO RELATED APPLICATION

This application claims priority from Korean Patent Application No. 10-2016-0142152, filed on Oct. 28, 2016, in the Korean Intellectual Property Office, the disclosure of which is incorporated herein in its entirety by reference.

BACKGROUND

1. Field

Methods and devices consistent with exemplary embodiments relate to recognizing a fingerprint.

2. Description of the Related Art

The necessity for user authentication using unique characteristics (e.g., fingerprints, voices, faces, hands, or irises) of users has gradually increased. User authentication is frequently used for banking equipment, entrance controllers, mobile devices, laptop computers, etc. As mobile devices, such as smartphones, have currently become very popular, fingerprint readers for user authentication are employed to protect a large quantity of security information stored in the smartphones.

The accuracy of fingerprint recognition needs to be higher than that of other images because fingerprints are used for a personal authentication. Also, the fingerprint recognition rate may be markedly reduced even when a small foreign material appears in a fingerprint image.

SUMMARY

Exemplary embodiments provide methods of recognizing a fingerprint, whereby the recognition rate of fingerprints may be increased by correcting contaminated fingerprint images, and electronic devices using the methods.

Additional aspects will be set forth in part in the description which follows and, in part, will be apparent from the description, or may be learned by practice of various exemplary embodiments.

According to an aspect of an exemplary embodiment, a method of recognizing a fingerprint may include obtaining a fingerprint image from a fingerprint sensor, determining whether a pixel in the fingerprint image is defective based on a dispersion value of the pixel with respect to time, in response to determining that the pixel is defective, generating an interpolated pixel value of the pixel by performing interpolation on a first pixel value of the pixel based on a second pixel value of another pixel different from the pixel, and correcting the fingerprint image based on the interpolated pixel value.

The determining whether the pixel is defective may include determining that the pixel is defective in response to the dispersion value being less than a reference value.

The pixel may be defective if the pixel outputs a fixed pixel value for a predetermined period of time.

The predetermined period of time may be greater than a unit time of the dispersion value with respect to time.

The dispersion value with respect to time may include information about a third pixel value of a previous time.

The third pixel value of the previous time may be obtained from another fingerprint image different from the fingerprint image.

The determining whether the pixel is defective may further include determining an average value of each pixel in the finger print image with respect to time.

The dispersion value with respect to time may be determined by using the average value with respect to time.

The another pixel may be adjacent to the pixel.

The performing interpolation may include performing at least one of linear interpolation, dual linear interpolation, polynomial interpolation, and spline interpolation.

According to an aspect of another exemplary embodiment, an electronic device may include a fingerprint sensor configured to detect a fingerprint image, and a processor configured to correct the fingerprint image by determining whether a pixel in the fingerprint image is defective based on a dispersion value of the pixel with respect to time, and in response to determining that the pixel is defective, generating an interpolated pixel value of the pixel by performing interpolation on a first pixel value of the pixel based on a second pixel value of another pixel different from the pixel.

The processor may be further configured to determine the pixel is defective in response to the dispersion value with respect to time being less than a reference value.

The pixel may be defective if the pixel outputs a fixed pixel value for a predetermined period of time.

The predetermined period of time may be greater than a unit time of the dispersion value with respect to time.

The dispersion value with respect to time may include information about a third pixel value of a previous time.

The third pixel value of the previous time may be obtained from another fingerprint image different from the fingerprint image.

The processor may be further configured to determine an average value of each pixel in the finger print image with respect to time, and to determine the dispersion value with respect to time based on the average value.

The another pixel may be adjacent to the pixel.

The processor may be further configured to perform interpolation on the first pixel value by performing at least one of linear interpolation, dual linear interpolation, polynomial interpolation, and spline interpolation.

The electronic device may further include a touch screen, at least a part of the touch screen overlapping with the fingerprint sensor.

BRIEF DESCRIPTION OF THE DRAWINGS

The above and/or other aspects will become apparent and more readily appreciated from the following description of exemplary embodiments, taken in conjunction with the accompanying drawings in which.

DETAILED DESCRIPTION OF EXEMPLARY EMBODIMENTS

Reference will now be made in detail to exemplary embodiments, which are illustrated in the accompanying drawings, wherein like reference numerals refer to like elements throughout. In this regard, the various exemplary embodiments may have different forms and should not be construed as being limited to the descriptions set forth herein. Accordingly, the exemplary embodiments are merely described below, by referring to the figures, to explain aspects. Expressions such as "at least one of," when preceding a list of elements, modify the entire list of elements and do not modify the individual elements of the list. The word "exemplary" is used herein to mean "serving as an example or illustration." Any aspect or design described herein as "exemplary" is not necessarily to be construed as preferred or advantageous over other aspects or designs.

Hereinafter, a method of recognizing a fingerprint and a device including the same according to various exemplary embodiments will be described with reference to the accompanying drawings.

Figure 1:
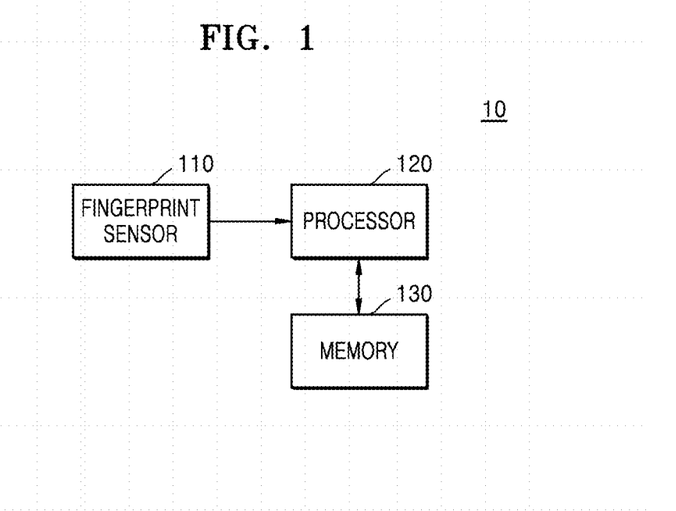
FIG. 1 is a block diagram of a device capable of recognizing a fingerprint according to an exemplary embodiment.

FIG. 1 is a block diagram of a device capable of recognizing a fingerprint according to an exemplary embodiment. Referring to FIG. 1, a fingerprint recognition device 10 may include a fingerprint sensor 110 detecting a fingerprint image of a user, a processor 120 obtaining the fingerprint image from the fingerprint sensor 110, correcting the obtained fingerprint image, and registering and authenticating the fingerprint image, and a memory 130 storing the fingerprint image.

The fingerprint sensor 110 may be an input image device detecting a fingerprint image (or image information of fingerprints) indicating specific characteristics of each user. The fingerprint sensor 110 may obtain an image corresponding to a surface of a sensing area. According to an aspect of an exemplary embodiment, the fingerprint sensor 110 may obtain a fingerprint image of a finger on a sensing area or an image of contaminants on a surface of the sensing area. An image detected by the fingerprint sensor 110 is referred to as a fingerprint image.

The fingerprint sensor 110 may be normally in an inactive state (also referred to as sleep state, deactivated state, or inactivated state) for efficiency of power management, and may be activated when a fingerprint input is required.

A method of detecting a fingerprint image used by the fingerprint sensor 110 may vary according to a type of the fingerprint sensor 110. According to an exemplary embodiment, the fingerprint sensor 110 may detect a fingerprint image by using an optical method, a semiconductor method, an ultrasonic wave method, or a non-contact method.

When the fingerprint sensor 110 is an optical sensor, the fingerprint sensor 110 may include, according to an exemplary embodiment, a prism, a light source, a lens, or a charge coupled device (CCD). In this case, when a finger contacts a prism, a light source may irradiate light on the prism, a lens may collect light reflected by the prism, and a CCD may detect the collected light as a fingerprint image.

When the fingerprint sensor 110 is a semiconductor fingerprint sensor, the fingerprint sensor 110 may include, according to an exemplary embodiment, a thermal sensor, a capacitive sensor, or an electric sensor. In this case, the fingerprint sensor 110 may be used in a personal device because the semiconductor fingerprint sensor 110 can be miniaturized.

A thermal sensor may use a method of obtaining a fingerprint image from temperature distribution that is generated by a temperature difference between a contact portion and a non-contact portion of a fingerprint. A capacitive sensor may use a method of obtaining a fingerprint image based on a difference between charge amounts or electrostatic capacitances that are charged between ridges of a contact fingerprint. An electric sensor may use a method of detecting a fingerprint image from an electric field formed in a fingerprint when a finger contacts a sensor or around the fingerprint.

The fingerprint sensor 110 may include a plurality of pixels arranged in a matrix form. Each of the pixels outputs a pixel value with respect to a feature of a fingerprint, and a resolution of a fingerprint image may be determined according to the number of pixels.

The fingerprint sensor 110 may include at least a part of the processor 120 to be described below. According to an exemplary embodiment, the fingerprint sensor 110 may perform operations of correcting a fingerprint image or calculating features of a fingerprint image in addition to an operation of obtaining a fingerprint image. In this case, the fingerprint sensor 110 may be a functional module having a hardware module and/or a software module. The fingerprint sensor 110 may be exposed to a side of a housing of the fingerprint recognition device 10.

The processor 120 may control a plurality of components connected to the processor 120 by driving an operating system and an application program. The processor 120 may recognize a fingerprint image of a user, the fingerprint image being obtained from the fingerprint sensor 110, register the recognized fingerprint image, or authenticate a user.

According to an exemplary embodiment, when registering a fingerprint, the processor 120 may convert the obtained fingerprint image into a specific image or may encrypt the obtained fingerprint image through various processes, for example, a process of converting a gray scale value into a black color or a white color. In addition, the processor 120 may store the fingerprint image in a secure area of the memory 130 to compare the stored fingerprint image with a fingerprint template in the future. Alternatively, when authenticating a fingerprint, the processor 120 may authenticate a user by comparing the obtained fingerprint image with a registered fingerprint template. In this case, according to an aspect of an exemplary embodiment, the processor 120 may perform a matching algorithm to confirm matching of the obtained fingerprint image with the registered fingerprint template.

Before registering or authenticating a fingerprint, the processor 120 may determine whether a fingerprint image is contaminated. If a foreign material exists on a sensing area of the fingerprint sensor 110, a fingerprint image obtained by the fingerprint sensor 110 may include not only a fingerprint of a user but also the foreign material. Therefore, the resulting fingerprint image may include contamination or visual imperfections. Alternatively, when a pixel of the fingerprint sensor 110 outputs a fixed or substantially fixed value regardless of fingerprints being input but does not output a pixel value corresponding to features of a fingerprint, the fingerprint image may be suspected to contain contamination. A pixel value output from a contaminated area of a fingerprint image may be fixed or substantially fixed due to foreign materials or defective pixels. Therefore, the processor 120 may determine whether a fingerprint image is contaminated by using a pixel value of the fingerprint image and may correct the fingerprint image. A method of correcting a fingerprint image will be described later below.

The memory 130 may store a fingerprint image, etc. The memory 130 may temporarily store a fingerprint image processed by the processor 120, and may store a fingerprint template required for authenticating. Alternatively, the memory 130 may store an average value and a dispersion value of each pixel with respect to time to correct a fingerprint image.

Hereinafter, a method performed by the processor 120 to determine whether a fingerprint image is contaminated and correcting the fingerprint image will be described in detail. When a sensing area includes foreign materials or a pixel of the fingerprint sensor 110 is defective, a corresponding pixel may output a fixed or substantially fixed pixel value regardless of a fingerprint. Therefore, a pixel outputting a fixed pixel value may be referred to as a defective pixel. A defective pixel may have a hardware defect, or may have a foreign material or object lodged or deposited on a sensing area corresponding to the pixel for a predetermined period of time. In other words, even a defect on an image due to a foreign material may be also treated as a defect of a pixel.

Figure 2:
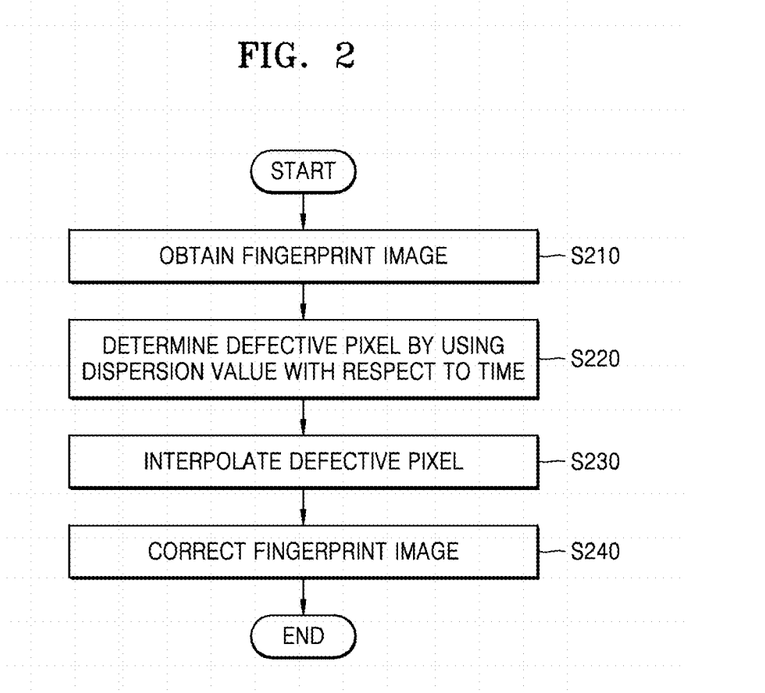
FIG. 2 is a flowchart of a method of recognizing a fingerprint by detecting a defective pixel according to an exemplary embodiment.
Figure 3:
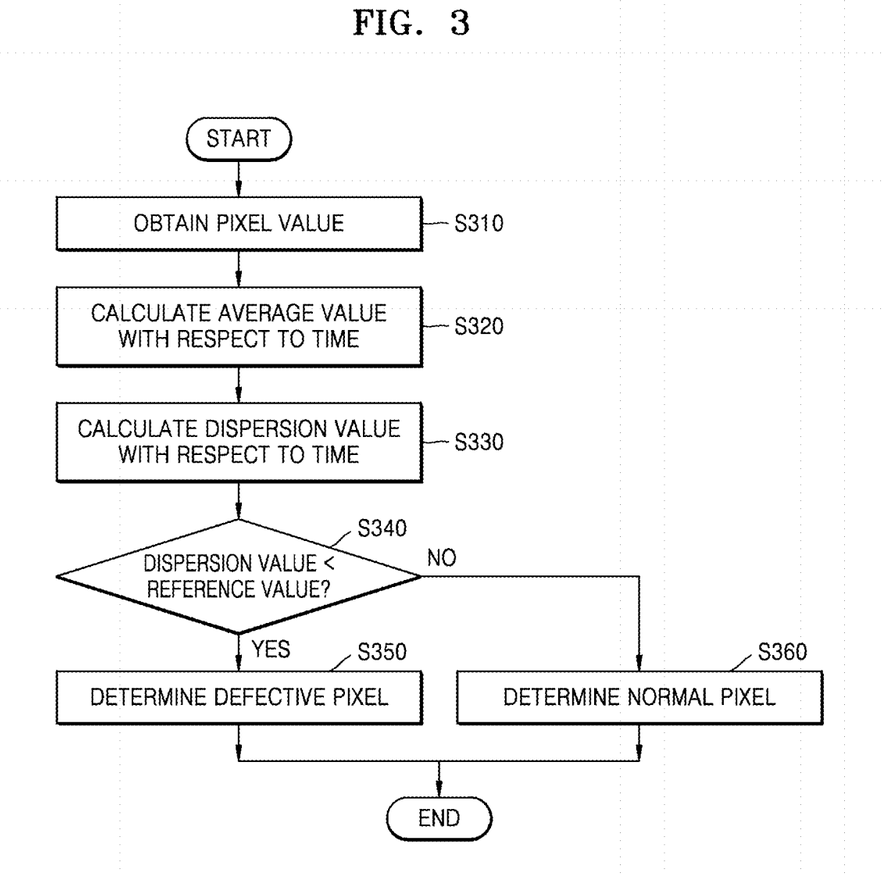
FIG. 3 is a flowchart of a method of determining whether each pixel in a fingerprint image is defective, according to an exemplary embodiment.

FIG. 2 is a flowchart of a method of recognizing a fingerprint by detecting a defective pixel according to an exemplary embodiment, and FIG. 3 is a flowchart of a method of determining whether each pixel in a fingerprint image is defective, according to an exemplary embodiment.

As shown in FIGS. 2 and 3, in operation S210, the fingerprint sensor 110 may detect a fingerprint image and the processor 120 may obtain the fingerprint image from the fingerprint sensor 110. Each pixel of the fingerprint sensor 110 may output specific values such as light, temperature, or capacitance based on fingerprint characteristics of a user. A value output from each pixel is referred to as a pixel value.

In operation S220, the processor 120 may determine whether each pixel in a fingerprint image is a defective pixel by using a dispersion value of a pixel with respect to time. The dispersion value of a pixel with respect to time may include historical information about pixel values of the corresponding pixel in previous time.

The criteria for determining whether a specific pixel is a defective pixel or a normal pixel will be described in detail with reference to FIG. 3. In operation S310, the processor 120 may obtain a pixel value I(n, m, t) of each pixel from a fingerprint image. The pixel value is a value of a pixel located at coordinates (n, m) from among the pixels arranged in the matrix form of the fingerprint sensor 110, where n and m are integers.

In operation S320, the processor 120 may calculate an average value of each pixel with respect to time at a time t. The processor 120 may obtain an average value $\mu_I(n, m, t)$ of a specific pixel with respect to time at time t by using a pixel value of a pixel obtained from the current time t and an average value $\mu_I(n, m, t-1)$ of a pixel with respect to time obtained from a time t−1 immediately before the current time as shown in Equation 1 below.

$$\mu_I(n,m,t)=\alpha \cdot I(n,m,t)+(1-\alpha)\mu_I(n,m,t-1) \quad \text{[Equation 1]}$$

where, α denotes a weight that is a constant greater than 0 and less than 1, and may be set by a human operator.

Furthermore, in operation S330, the processor 120 may calculate a dispersion value of each pixel with respect to time at time t. For example, the processor 120 may obtain a dispersion value $\sigma^1_I(n, m, t)$ of a pixel with respect to time, the pixel located at (n, m) at time t, by using a pixel value I(n, m, t) of a pixel located at (n, m) at time t, an average value $\mu_I(n, m, t)$ of a pixel with respect to time, the pixel located at (n, m), at time t, and a dispersion value $\rho^2_I(n, m, t-1)$ of a pixel with respect to time obtained from time t−1 immediately before current time.

$$\rho^2_I(n,m,t)=\beta \cdot [I(n,m,t)-\mu_I(n,m,t)]^2+(1-\beta)\rho^2_I(n,m,t-1) \quad \text{[Equation 2]}$$

where, β denotes a weight that is a constant greater than 0 and less than 1, and may be set by a human operator.

An average value and a dispersion value of a pixel with respect to time may be updated whenever a fingerprint image is obtained. A unit time of the average value and the dispersion value of a pixel with respect to time may be the same as an interval of acquisition times of two fingerprint images temporally close to each other (e.g., two successive fingerprint images). A predetermined period time for which a defective pixel outputs a fixed pixel value may be greater than a unit time of the dispersion value with respect to time.

In Equations 1 and 2, the processor 120 uses an average value and a dispersion value of a pixel with respect to time obtained at time t−1 immediately before current time to obtain an average value and a dispersion value of a pixel with respect to time at the current time, but embodiments are not limited thereto. The processor 120 may obtain an average value $\mu_I(n, m, t)$ and a dispersion value $\rho^2_I(n, m, t)$ with respect to time by using a pixel value leading up to the current time as shown in Equations 3 and 4 below.

$$\mu_I(n, m, t) = \frac{1}{K}\sum^{K} I(n, m, t) \quad \text{[Equation 3]}$$

$$\sigma^2_I(n, m, t) = \frac{1}{K}\sum^{K} [I(n, m, t) - \mu_I(n, m, t)]^2 \quad \text{[Equation 4]}$$

where, K denotes the number of recent images based on the current time.

A method of an average value and a dispersion value with respect to time may vary. However, when an average value and a dispersion value with respect to time are calculated as shown in Equations 1 and 2, computation load may be reduced because there is no need of storing a pixel value with respect to time that is previous to time immediately before the current time except for an average value and a dispersion value with respect to the time immediately before the current time.

In operation S340, the processor 120 compares a dispersion value of each pixel with respect to time with a reference value.

When a dispersion value is less than a reference value (corresponding to "Yes" of operation S340), in operation S350, the processor 120 may determine a corresponding pixel as being a defective pixel. When a pixel of the fingerprint sensor 110 has a defect (e.g., a hardware defect), the processor 120 may output a fixed value regardless of characteristics of fingerprints of the pixel. For example, when the fingerprint sensor 110 is an optical sensor, a defective pixel may output a pixel value with a fixed brightness value even across different fingerprint images. A defective pixel has a respectively low dispersion value with respect to time because the defective pixel outputs a fixed or substantially fixed pixel value regardless of time. Furthermore, when a foreign material is on a sensing area, the defective pixel may output a fixed pixel value regardless of characteristics of fingerprints of a pixel corresponding to the area where the foreign material exists. In other words, a dispersion value with respect to time is small. Therefore, the processor 120 may determine a pixel having a dispersion value less than a reference value as being a defective pixel.

Alternatively, when a dispersion value is greater than or equal to the reference value (corresponding to "No" of operation S340), in operation S360, the processor 120 may determine a corresponding pixel as a normal pixel. When a pixel is a normal pixel, the pixel may output a pixel value corresponding to characteristics of fingerprints. In other words, a pixel value may vary according to time. Therefore, a dispersion value with respect to time of a normal pixel may be the same as a reference value or more.

As such, a separate device for inspecting a pixel is not necessary because whether a pixel is normal or defective may be determined by a fingerprint image. Furthermore, the processor 120 may determine whether a pixel is normal or defective in real time while a fingerprint recognition device is used. In addition, the processor 120 may also confirm a defect due to a foreign material on a sensing area of the fingerprint sensor 110 in real time as well as a hardware defect of the fingerprint sensor 110 because the processor 120 utilizes a pixel image for the identification of defects.

In operation S230, when a pixel is determined to be a defective pixel, the processor 120 may perform interpolation on a pixel value of the defective pixel by using a pixel value of another pixel different from the defective pixel. The other pixel may be one or more pixels that are adjacent to the defective pixel. The interpolation may be based on linear interpolation, dual linear interpolation, polynomial interpolation, and/or spline interpolation.

For example, when a pixel located at (n', m') is determined as being a defective pixel, the processor 120 may determine or approximate a pixel value of a pixel located at (n', m') as shown in Equation 5 below. Although an average of four adjacent pixel values are used in this example to approximate the pixel value of the pixel located at (n', m'), Equation 5 may be adapted to use a greater or fewer number of pixels to approximate the target pixel value.

$$I(n',m',t)=\{I(n'-1,m',t)+I(n'+1,m',t)+I(n',m'-1,t)+I(n',m'+1,t)\}/4 \quad \text{[Equation 5]}$$

In operation S240, the processor 120 may correct a fingerprint image by determining a pixel value of a defective pixel as an interpolated pixel value. The corrected fingerprint image may be utilized in various applications such as registration or authentication.

Figure 4A:
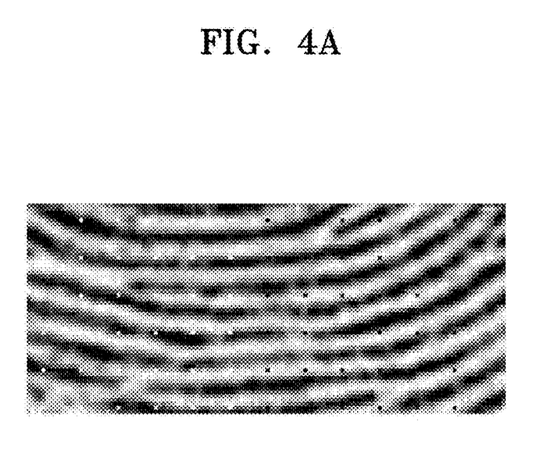
FIGS. 4A to 4E are views of experimental results by a method of recognizing a fingerprint according to an exemplary embodiment.

FIGS. 4A to 4E show experimental results obtained by using a method of recognizing a fingerprint according to an exemplary embodiment. The fingerprint sensor 110 may detect a fingerprint image of a user. FIG. 4A shows a fingerprint image obtained by the fingerprint sensor 110 at a current time, for example, at time t. The processor 120 may calculate an average value and a dispersion value of each pixel with respect to time corresponding to the fingerprint image. When respectively calculating an average value and a dispersion value with respect to time, the processor 120 may use a pixel value of a pixel at the current time (i.e., time t) and an average value and a dispersion value with respect to time calculated at time t−1 before the current time t.

Figure 4B:
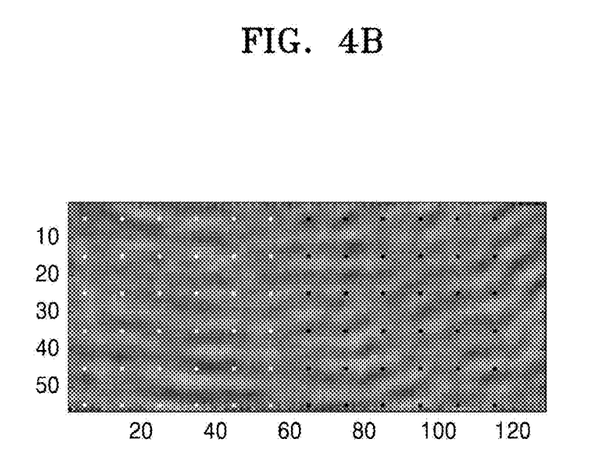
Figure 4C:
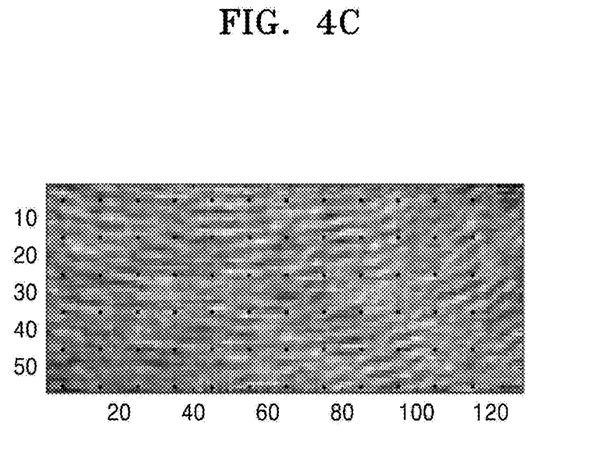
Figure 4D:
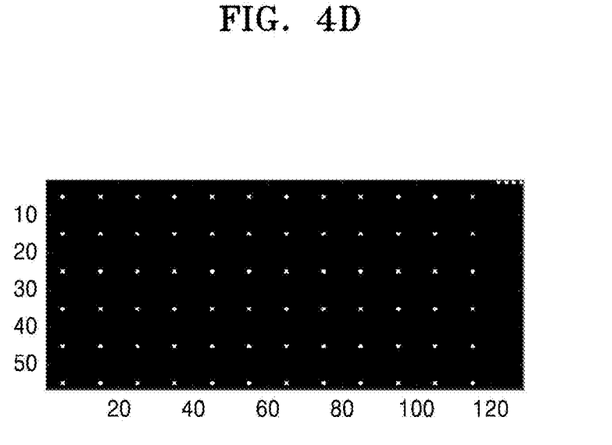
Figure 4E:
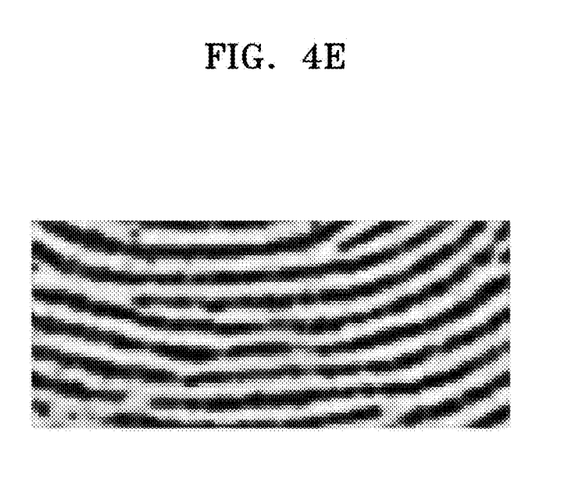

FIG. 4B shows an average value with respect to time of a fingerprint image calculated at time t, that is, an average image, and FIG. 4C shows a dispersion value with respect to time of the fingerprint image calculated at time t, that is, a disperse image. In these exemplary images, a pixel value is visually represented by a pixel having a corresponding grayscale value. Furthermore, the processor 120 may determine a pixel having a dispersion value with respect to time less than a reference value as being a defective pixel. FIG. 4D shows an image displaying defective pixels in a dot form. Although the defective pixels in FIG. 4D are represented in a grid formation, the present disclosure is not limited thereto. For example, one or more defective pixels may be located anywhere in the fingerprint image in any pattern or lacking a pattern. The processor 120 may perform interpolation on a pixel value of a defective pixel by using a pixel value of another pixel different from the defective pixel. For example, linear interpolation may be used for the interpolation process. FIG. 4E shows a fingerprint image in which a pixel value of a defective pixel is interpolated and corrected. The corrected fingerprint image of FIG. 4E is clearer than the fingerprint image before correction of FIG. 4A.

The fingerprint recognition device may be an independent device or may be an electronic device having other functions.

Figure 5:
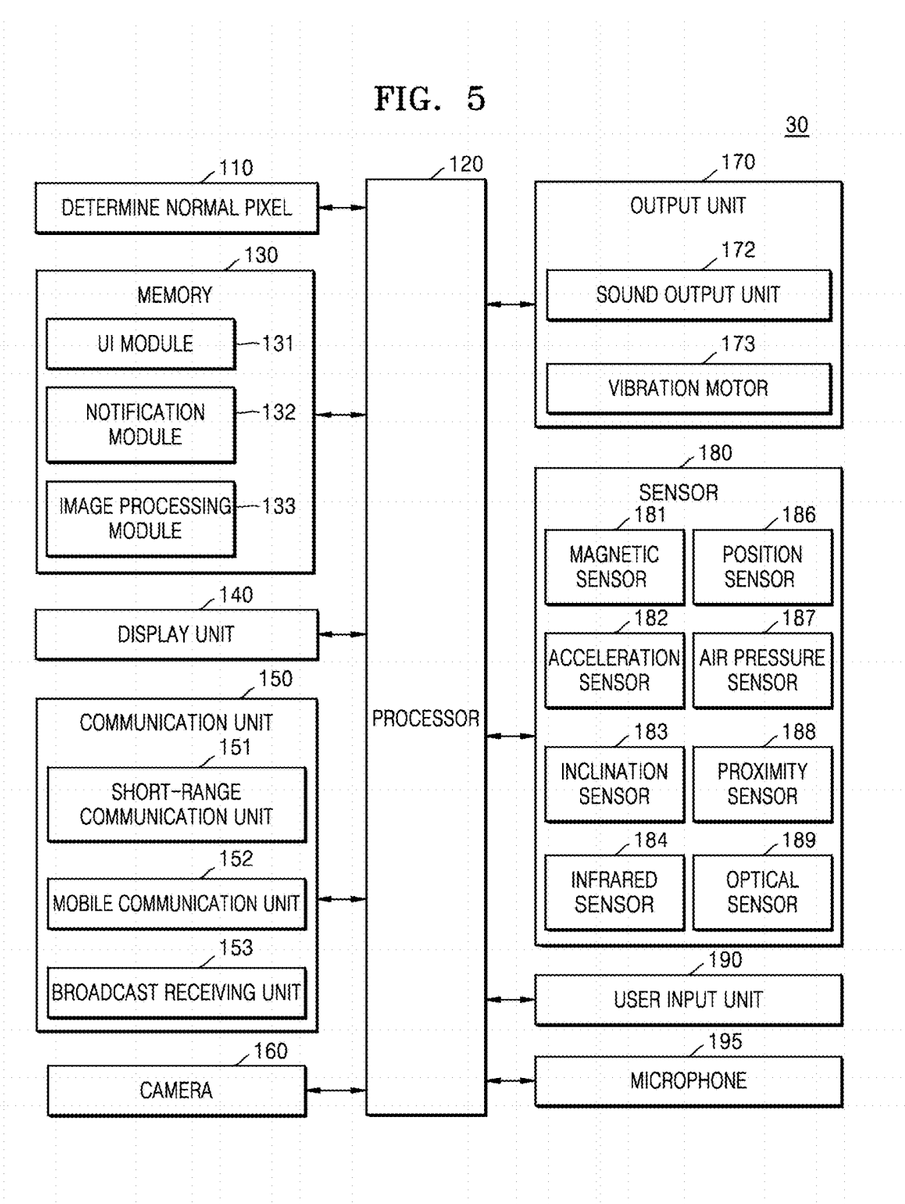
FIG. 5 is a block diagram showing an example of an electronic device using a method of recognizing a fingerprint, according to an exemplary embodiment.

FIG. 5 is a block diagram showing an example of an electronic device using a method of recognizing a fingerprint, according to an exemplary embodiment.

For example, an electronic device 30 may be a small mobile device such as a smart phone, a smart watch, a tablet personal computer (PC), a laptop computer, personal digital assistants (PDA), or a portable multimedia player (PMP). As shown in FIG. 5, the electronic device 30 may include, for example, the fingerprint sensor 110, the processor 120, the memory 130, a display unit 140, a communication unit 150, a camera 160, an output unit 170, one or more sensors 180, a user input unit 190, and a microphone 195. The fingerprint sensor 110, the processor 120, and the memory 130 of the electronic device 30 include functions of the fingerprint sensor 110, the processor 120, and the memory 130 of FIG. 1, respectively. Hereinafter, other functions of the electronic device 30 besides a fingerprint recognition function will be described.

The processor 120 controls general operations of the electronic device 30. For example, the processor 120 may generally control the user input unit 190, the output unit 170, the communication unit 150, the sensor 180, and the microphone 195 by executing programs stored in the memory 130.

The memory 130 may store programs for processing and controlling the processor 120. The programs stored in the memory 130 may be divided into a plurality of modules, for example, a user interface (UI) module 131, a notification module 132, and an image processing module 133, according to their respective functions. The UI module 131 may provide a specified UI and a graphical user interface (GUI) connected to the electronic device 30 per application. The notification module 132 may generate a signal for notifying that an event of the electronic device 30 is generated. The image processing module 133 may process an image by analyzing the image.

The display unit 140 may display information processed in the electronic device 30. When the display unit 140 and a touch pad form a layer structure and then are formed as a touch screen, the display unit 140 may be used as both an output device and an input device.

The communication unit 150 may include one or more elements for allowing communication between the electronic device 30 and external devices. For example, the communication unit 150 may include a short-range communication unit 151, a mobile communication unit 152, and a broadcast receiving unit 153.

The output unit 170, which outputs an audio signal, a video signal, or a vibration signal, may also include a sound output unit 172, a vibration motor 173, or the like besides the display unit 140. The sound output unit 172 outputs audio data that is received from the communication unit 150 or is stored in the memory 130. The vibration motor 173 may output a vibration signal. For example, the vibration motor 173 may output a vibration signal that corresponds to an output of the audio data (e.g., call signal receiving sound, message receiving sound, or the like) or video data.

The sensor 180 may sense a state of the electronic device 30, a state around the electronic device 30, or a state of a user wearing the electronic device 30 and may transfer sensed information to the processor 120.

The sensor 180 may include at least one selected from a magnetic sensor 181, an acceleration sensor 182, an inclination sensor 183, an infrared sensor 184, a position sensor (e.g., a global positioning system (GPS)) 186, an air pressure sensor 187, a proximity sensor 188, and an optical sensor 189, but embodiments are not limited thereto.

The user input unit 190 may be a unit by which a user inputs data for controlling the electronic device 30. For example, the user input unit 190 may include a keypad, a dome switch, a touch pad (e.g., a contact capacitance type, a pressure resistance film type, an infrared sensing type, an ultrasonic transmission type in a surface, an integral tension measurement type, a piezoelectric effect type, etc.), a jog wheel, a jog switch, and the like, but is not limited thereto.

The electronic device 30 may include the microphone 195 as an audio/video (A/V) input unit. The microphone 195 receives an input of an external sound signal and processes the received sound signal into electrical voice data. For example, the microphone 195 may receive a sound signal from an external device 30 or a speaker.

The fingerprint sensor 110 may be located in a separate area different from the display unit 140 or an area overlapping the display unit 140.

Figure 6A:
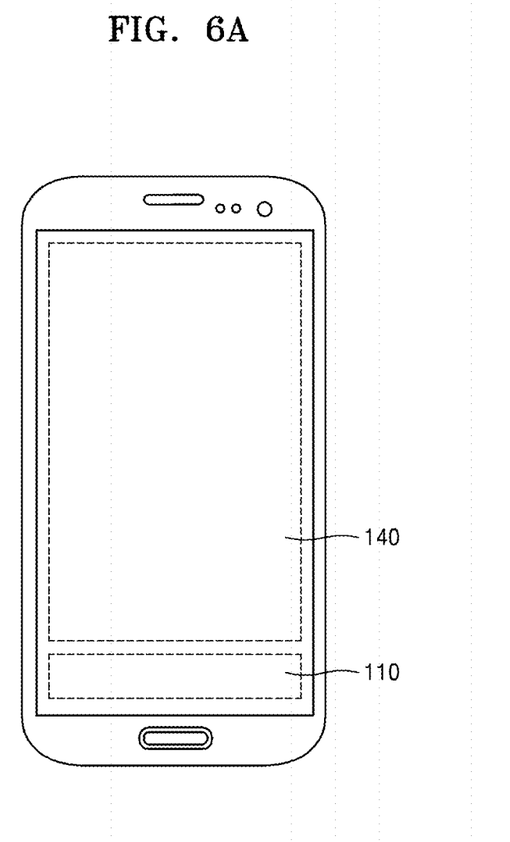
FIGS. 6A and 6B are views showing examples of arranging a fingerprint sensor and a display according to an exemplary embodiment.
Figure 6B:
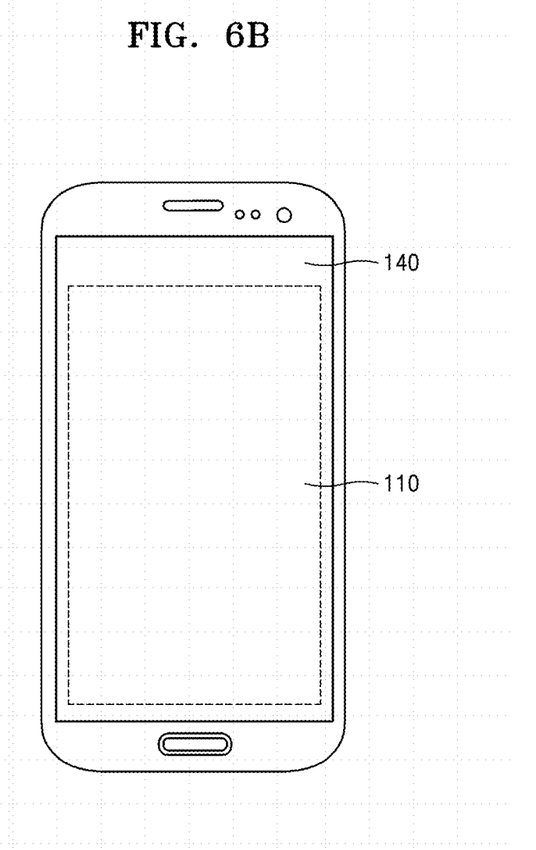

FIGS. 6A and 6B are views showing examples of arranging a fingerprint sensor and a display according to an exemplary embodiment. As illustrated in FIG. 6A, the fingerprint sensor 110 may be disposed in an area not overlapping the display unit 140. Alternatively, as illustrated in FIG. 6B, the fingerprint sensor 110 may be disposed in an area overlapping the display unit 140. When the display unit 140 is a touch screen, the display unit 140 of FIG. 6B may be referred to as a touch screen having a fingerprint recognition function. The touch screen having a fingerprint recognition function may perform both a fingerprint recognition function for user authentication and a touch sensing function capable of inputting various commands and information to the electronic device 30 with a finger touch. Since the touch screen having a fingerprint recognition function has a larger sensing area of fingerprints, a fingerprint recognition rate may be decreased due to contamination. A pixel value of a defective pixel in a contaminated area may be interpolated by using the methods of recognizing a fingerprint described above, and therefore, a fingerprint recognition rate may be increased. A fingerprint image may be corrected by identifying a pixel outputting a fixed value for a predetermined period of time and by interpolating a pixel value of the defective pixel.

It should be understood that embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of processing a fingerprint, the method comprising:
   obtaining a fingerprint image from a fingerprint sensor;
   calculating a dispersion value of each of a plurality of pixels of the fingerprint image with respect to time at a first time;
   determining a pixel having the dispersion value less than a reference value among the plurality of pixels of the fingerprint image as a defective pixel;
   in response to determining that the pixel is the defective pixel, generating an interpolated pixel value of the pixel by performing interpolation on a first pixel value of the pixel based on a second pixel value of another pixel different from the pixel; and
   correcting the fingerprint image based on the interpolated pixel value, wherein the dispersion value of each of the pixels with respect to time at the first time is calculated by using a pixel value of each of the pixels at the first time, an average value of each of the pixels with respect to time at the first time, and a dispersion value of each of the pixels with respective to time calculated at a second time immediately before the first time from another fingerprint image different from the fingerprint image.

2. The method of claim 1, wherein the pixel is the defective pixel if the pixel outputs a fixed pixel value for a predetermined period of time.

3. The method of claim 2, wherein the predetermined period of time is greater than a unit time of the dispersion value with respect to time at the first time of the fingerprint image.

4. The method of claim 1, wherein the determining the pixel is defective further comprises determining the average value of each of the pixels in the fingerprint image with respect to time at the first time.

5. The method of claim 1, wherein the another pixel is adjacent to the pixel.

6. The method of claim 1, wherein the performing interpolation comprises performing at least one of linear interpolation, dual linear interpolation, polynomial interpolation, and spline interpolation.

7. An electronic device comprising:
   a fingerprint sensor configured to detect a fingerprint image; and
   a processor configured to correct the fingerprint image by calculating a dispersion value of each of a plurality of pixels of the fingerprint image with respective to time at a first time, determining a pixel having the dispersion value less than a reference value among the plurality of pixels of the fingerprint image as a defective pixel, and in response to determining that the pixel is the defective pixel, generating an interpolated pixel value of the pixel by performing interpolation on a first pixel value of the pixel based on a second pixel value of another pixel different from the pixel,
   wherein the dispersion value of each of the pixels with respect to time at the first time is calculated by using a pixel value of each of the pixels at the first time, an average value of each of the pixels with respect to time at the first time, and a dispersion value of each of the pixels with respective to time calculated at a second time immediately before the first time from another fingerprint image different from the fingerprint image.

8. The electronic device of claim 7, wherein the pixel is the defective pixel if the pixel outputs a fixed pixel value for a predetermined period of time.

9. The electronic device of claim 1, wherein the predetermined period of time is greater than a unit time of the dispersion value with respect to time at the first time of the fingerprint image.

10. The electronic device of claim 7, wherein the processor is further configured to determine the average value of each of the pixels in the fingerprint image with respect to time at the first time.

11. The electronic device of claim 7, wherein the another pixel is adjacent to the pixel.

12. The electronic device of claim 7, wherein the processor is further configured to perform interpolation on the first pixel value by performing at least one of linear interpolation, dual linear interpolation, polynomial interpolation, and spline interpolation.

13. The electronic device of claim 7, further comprising: a touch screen overlapping the fingerprint sensor.

* * * * *